United States Patent

Miyamoto

[15] 3,663,030
[45] May 16, 1972

[54] SPACER EXPANDER AND PROCESS OF MANUFACTURE OF SAME

[72] Inventor: Mikio Miyamoto, Omiya, Japan
[73] Assignee: Nippon Piston Ring Co., Ltd., Tokyo, Japan
[22] Filed: July 13, 1970
[21] Appl. No.: 54,279

[30] Foreign Application Priority Data
July 12, 1969 Japan..............................44/54831

[52] U.S. Cl..............................277/140, 277/141, 267/1.5
[51] Int. Cl............................................F02f 5/00, F16j 9/06
[58] Field of Search................277/160, 139, 140, 141, 202; 267/1.5

[56] References Cited
UNITED STATES PATENTS 3,103,365 9/1963 Callerfelt................................277/140
2,886,385 5/1959 Marien....................................277/139

Primary Examiner—Samuel B. Rothberg
Attorney—Sughrue, Rothwell, Mion, Zinn & Macpeak

[57] ABSTRACT

A spacer expander is of U shape in radial cross section and has upper and lower pressure supporting surfaces which have projections for urging side rails radially. Intermediate curved portions extend between adjacent pairs of upper and pairs of lower pressure supporting surfaces for circumferentially connecting the same.

1 Claim, 5 Drawing Figures

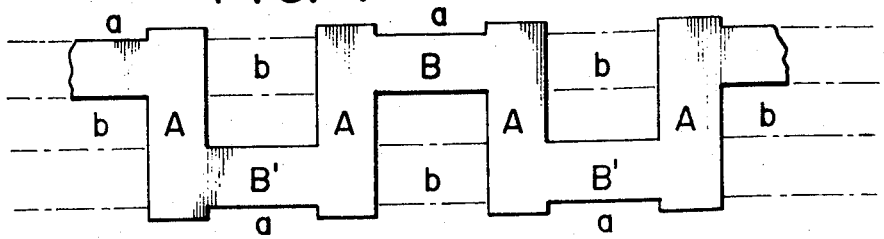
FIG. 1
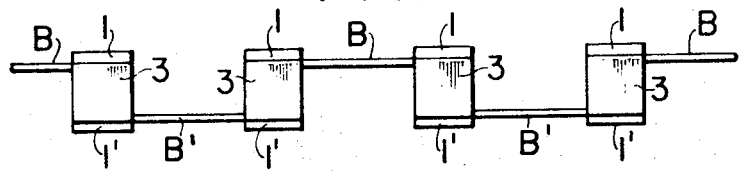
FIG. 2
FIG. 5
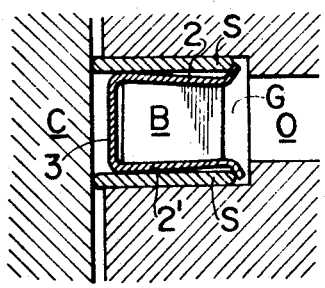
FIG. 3
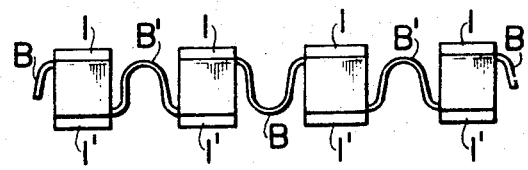
FIG. 4
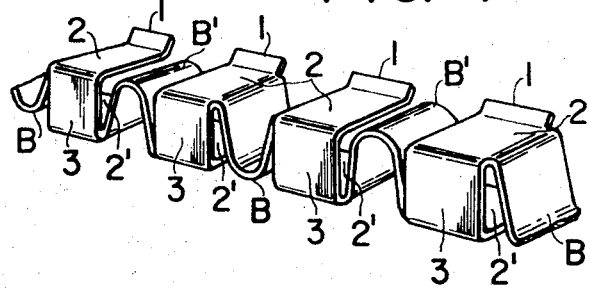
INVENTOR.
MIKIO MIYAMOTO
BY Sughrue, Rothwell, Mion,
Zinn & Macpeak
ATTORNEYS

SPACER EXPANDER AND PROCESS OF MANUFACTURE OF SAME

BACKGROUND OF THE INVENTION

1. Field of the Invention

This invention relates to a spacer expander, and more particularly to improvements in the expander to impart high strength and resiliency thereto and a process of manufacture therefor.

2. Summary of the Invention

The present invention provides a spacer expander which is U shape in radial cross section, formed of steel sheet which has a high strength and a resiliency in circumferential, radial and axial directions so as to overcome the problem of the decrease of the strength due to fatigue allowing long usage with uniform pressure and resiliency.

It is another object of this invention to provide a process for manufacturing a spacer expander of U shape in radial cross section which is less expensive and forms a simple structure.

According to one aspect of the present invention, there is provided a spacer expander of U shape in radial cross section which comprises upper and lower pressure supporting surfaces which have projections for urging side rails radially. Outer vertical peripheral surfaces connect axially aligned upper and lower pressure supporting surfaces and connect pairs of adjacent upper pressure supporting surfaces and are U shape in axial cross section and alternately, other intermediate curved portions connect circumferentially, adjacent pairs of lower pressure supporting surfaces, which are also U shaped in axial cross section. The respective intermediate curved portions are preferably of the same circumferential and radial width.

Other objects, features and advantages of the present invention will become apparent from the following description taken in conjunction with the accompanying drawings, in which:

BRIEF DESCRIPTION OF THE DRAWING

FIG. 1 is a plan view of part of the original stamped metal sheet forming the spacer expander of this invention.

FIG. 2 is a front view of a portion of the original sheet curved in U shape in radial cross section.

FIG. 3 is a front view of a portion of the spacer expander formed from the sheet shown in FIG. 2, according to this invention.

FIG. 4 is a perspective view of the expander portion shown in FIG. 3.

FIG. 5 is a longitudinal side sectional view of part of the expander inserted into a piston groove with side rails in accordance with the present invention.

DESCRIPTION OF THE PREFERRED EMBODIMENT

Reference is now made to the drawing, and particularly to FIG. 1. In the process of forming the spacer expander of this invention, a steel sheet strip is cut to define shallow cutouts $a$ of rectangular form and is also cut to define deep cutouts $b$ of rectangular form on the opposite side of the shallow cutout $a$. Cutouts $b$ have the same width as the shallow cutouts $a$ in symmetry. The sheet strip is also cut with a deep cutout $b$ in rectangular form adjacent to each shallow cutout $a$ and is also cut in shallow cutout $a$ in rectangular form on the opposite side to the deep cutout $b$ and of the same width as that of the deep cutout $b$ in symmetry, as shown in FIG. 1, and so on, in turn in the same distance and adjacent to each other. Thus, there are provided projections, upper and lower pressure supporting surfaces, and vertical surfaces between the cutouts $a$ and $b$ designated by A, and there are also provided upper intermediate portions B connecting the adjacent upper pressure supporting surfaces and traverse plates A are also provided as are lower intermediate portions B' for connecting between the adjacent lower pressure supporting surfaces and traverse plates A.

The original cut plate is then bent along the bottom edge lines of the shallow cutout $a$ in such a manner that the projected portions of the traverse plate A are directed perpendicularly to the plane of the figure so as to form upper and lower projections 1 and 1' as shown in FIG. 2. Then, the original plate is also bent along the bottom edge lines of the deep cutout $b$ in such a manner that the upper and lower portions of the transverse plate A become perpendicular to the plane of the figure on the back thereof so as to form upper and lower pressure supporting surfaces 2 and 2' and upper and lower intermediate connecting portions B and B' which connect the upper pressure supporting surfaces and the lower pressure supporting surfaces, respectively in pairs and vertical surfaces 3 which give U shape in radial cross section forming a channel type spacer expander.

Thereafter, the intermediate connecting portions B and B' are bent and project in such a manner that the upper portion projects downwardly while the lower portion projects upwardly as shown in FIG. 3 in U shape. Then, the bent plate is circularly bent so that the projections 1 and 1' are disposed on the inside of the circular shape as shown in FIG. 4, so that the opening side of the U shape is disposed inside.

Finally, the spacer expander thus formed is combined with side rails S in such a manner that the side rails S are disposed on the upper and lower pressure pressure supporting surfaces 2 and 2' and within a piston grove G as shown in FIG. 5 so that the opening portion of the U shape faces on the bottom of the piston groove to define a piston ring of the channel type. In FIG. 5, reference character O designates an oil groove in a piston grove and C denotes a cylinder.

It should be understood from the foregoing description that since the spacer expander of this invention comprises upper and lower intermediate connecting portions for connecting alternate pairs of upper pressure supporting surfaces and lower pressure supporting surfaces, respectively, and are bent in U shape, the spacer has high strength as a whole and high resiliency appropriate for the circular expansion and contraction of the spacer expander upon disposition thereof within a piston groove. Particularly, it is noted that since the radial widths of the upper and lower pressure supporting surfaces 2 and 2' and intermediate portions B and B' are the same, the effect is one of high strength and, particularly a decrease in the fatigue thereof for repeated stresses.

It should be understood also that since the spacer expander of this invention has strong resiliency in the circular or circumferential radial and axial directions thereof and has high strength, it always provides uniform pressure for long periods so that it acts superior in combination with side rails as a piston ring in a piston groove.

It should be also understood that the spacer expander may be manufactured simply and less expensively.

What is claimed is:

1. A unitary spacer expander for disposition within a piston groove, between a pair of side rails, said expander being U shaped in radial cross section and comprising:
   a plurality of upper and lower pressure supporting portions including axial projections at their radially inner ends for radially urging said side rails disposed thereon,
   axial surfaces integrally coupling axially spaced upper and lower pressure supporting portions, and
   intermediate connecting portions coupling alternate pairs of upper and lower pressure supporting portions, integral therewith, extending circumferentially therebetween and bent axially into U shape in circumferential cross section, whereby said expander is circularly disposed within said piston groove with the open side of said U shaped expander facing internally within said groove.

* * * * *